Figure 1:
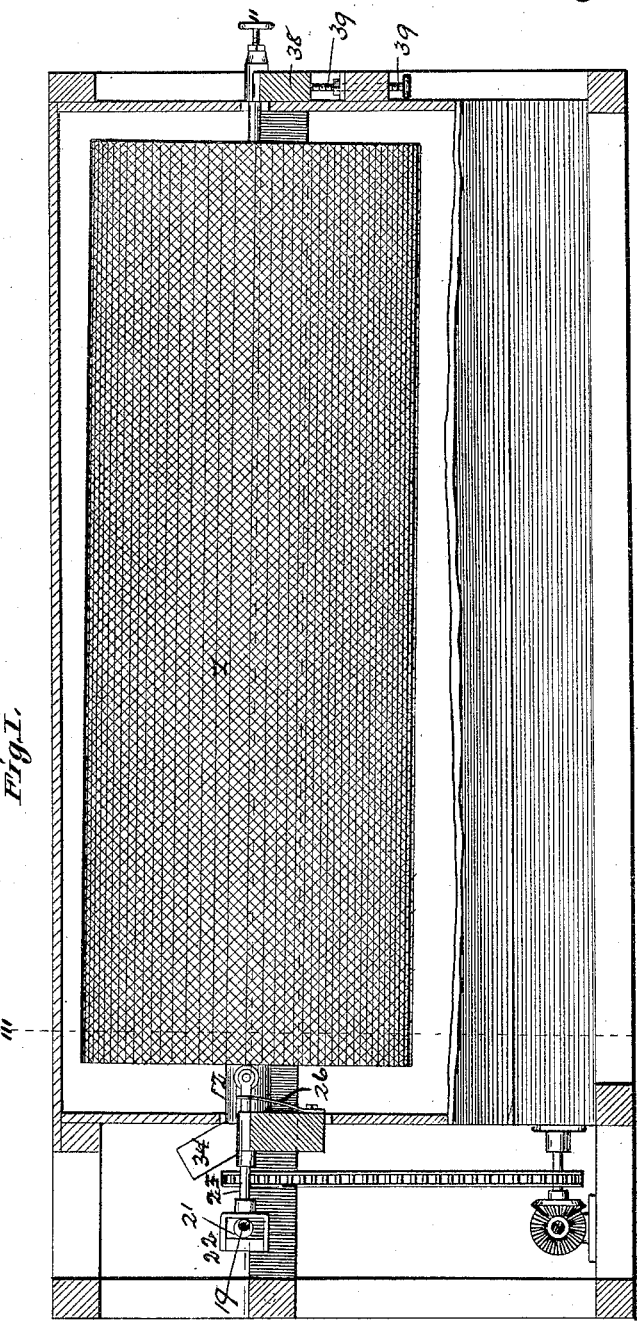

(No Model.) 3 Sheets—Sheet 1.

L. LINDSAY.
BOLTING REEL.

No. 433,575. Patented Aug. 5, 1890.

Attest:
E. Arthur
Samuel H. Knight

Inventor:
L. Lindsay
By Knight Bro
Attys

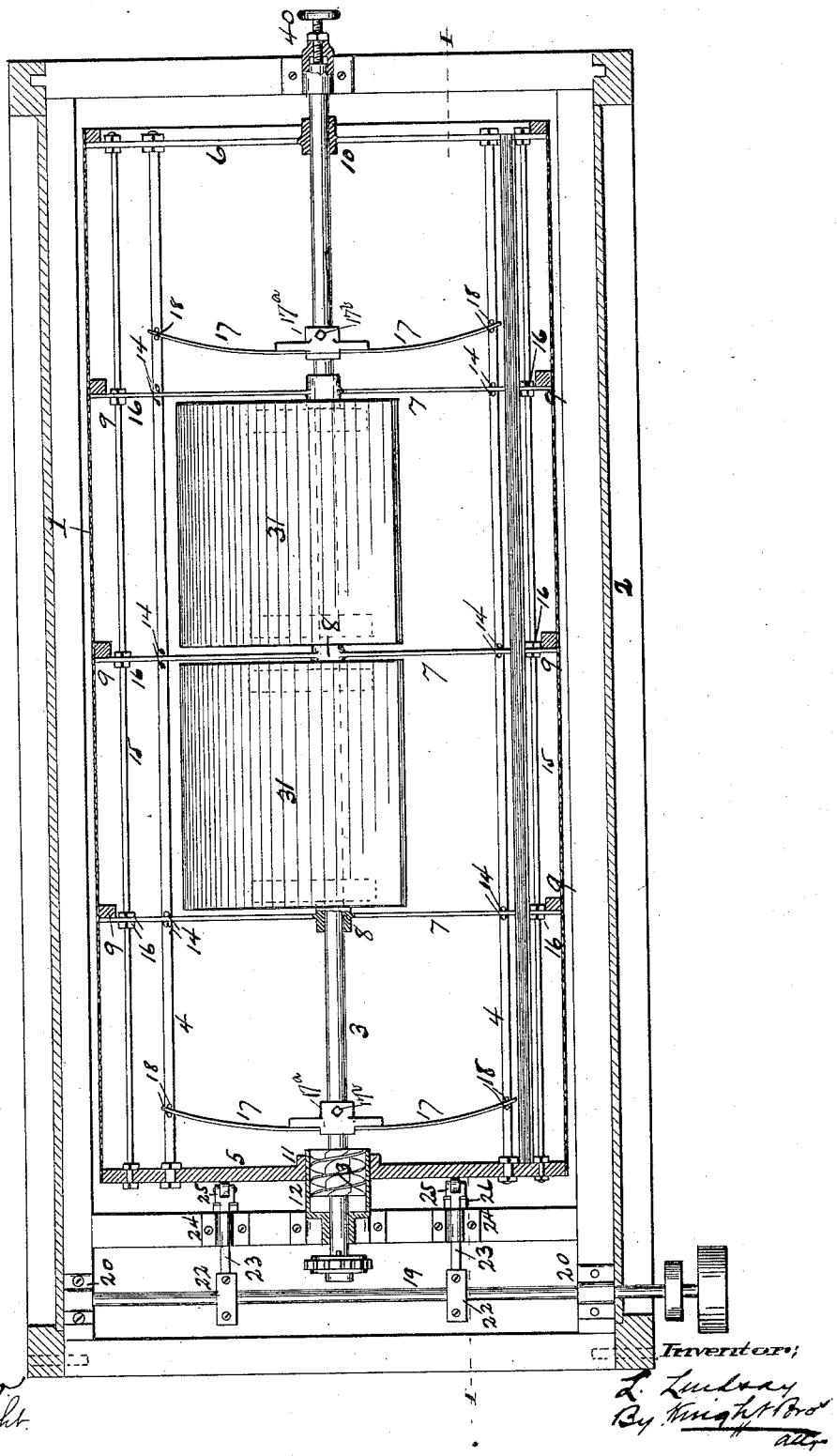

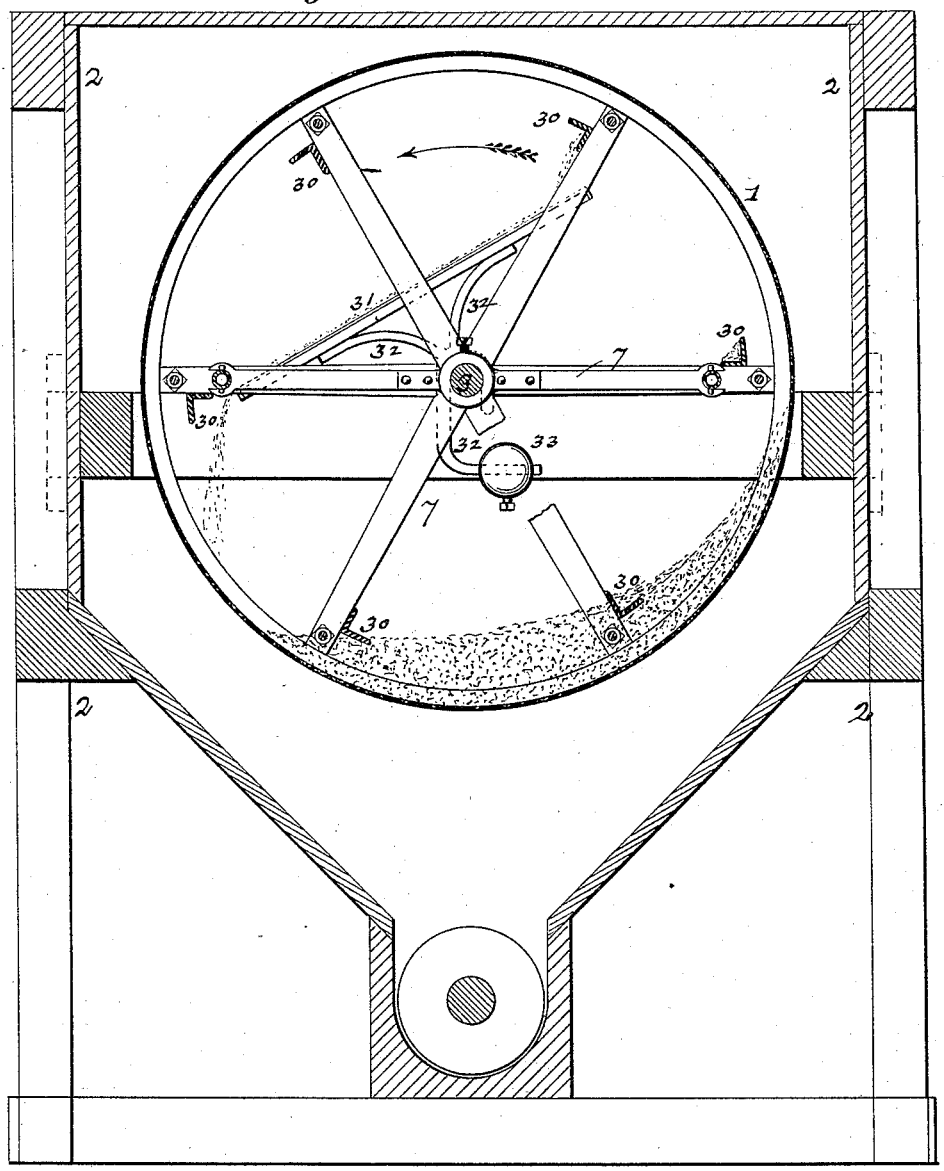

UNITED STATES PATENT OFFICE.

LYCURGUS LINDSAY, OF HUMBOLDT, KANSAS.

BOLTING-REEL.

SPECIFICATION forming part of Letters Patent No. 433,575, dated August 5, 1890.

Application filed July 27, 1889. Serial No. 318,890. (No model.)

*To all whom it may concern:*

Be it known that I, LYCURGUS LINDSAY, of Humboldt, in the county of Allen and State of Kansas, have invented a certain new and useful Improvement in Bolting-Reels, of which the following is a full, clear, and exact description, reference being had to the accompanying drawings, forming part of this specification, and in which—

Figure I is a longitudinal vertical section of my improved reel, taken on line II, Fig. II. Fig. II is a horizontal longitudinal section taken on line II II, Fig. I. Fig. III is a vertical transverse section taken on line III III, Fig. I.

My invention relates to certain improvements in reels for bolting flour and the like; and my invention consists in features of novelty hereinafter fully described, and pointed out in the claims.

Referring to the drawings, 1 represents the reel supported by a suitable frame-work 2, as usual. The reel is loosely mounted on a central shaft 3 by means of longitudinal rods 4, heads 5 and 6, and arms 7. The rods 4 connect the heads 5 and 6, as shown plainly in Fig. II, and the arms 7 have hubs 8, through which the shaft 3 loosely passes, and are secured by their outer ends at 9 to the reel. The head 6 is provided with a hub 10, that fits loosely on the shaft 3, and the head 5 is provided with a hub (or a mere opening it may be) 11, that fits loosely on a cylinder 12, within which is the feed-conveyer 13. The arms 7 may be connected to the rods 4 by pins 14, having jam-nuts, if desired, as shown in Fig. II.

15 represents additional rods connecting the heads together, and which may be connected to the arms 7 by means of nuts 16. It will be seen that the reel is thus loosely and movably supported on the shaft 3. The shaft 3 is held from end movement, but of course revolves.

17 represents springs rigidly secured to the shaft by collars 17$^a$ and set-screws 17$^b$ and connected at their outer ends to the rods 4, preferably by means of pins 18, although any other suitable keying device and form of connection might be used.

19 represents a transverse shaft journaled in boxes 20, secured to the frame of the machine. On this shaft (see Fig. I) are cams 21, inclosed by boxes or frames 22. (See Figs. I and II.) The boxes 22 are on the outer ends of agitating-rods 23. The rods pass loosely through boxes 24, and on their inner ends may be secured friction-rollers 25, which bear against the head 5 of the reel.

26 represents springs secured to the main frame of the machine and bearing against the rods 23, as shown in Figs. I and II, and which serve the purpose of keeping the rods from cramping in bearings 24 and 22, the cams 21 forcing the rods in both directions. Now when the machinery is set in motion and the reel is revolved the rotation of the shaft 19 causes the rods 23 to move in and out, and each time they thus move the reel is pushed by them and is thus vibrated. It is thus forced away from the shaft 19 against the pressure of the springs 17. Then as the rollers move back the reel is held tightly against the rollers 25 by the springs 17, and thus a continual end vibration is imparted to the reel for the purpose of agitating it to keep it clean and induce the passage of the stuff through the reel.

30 represents angle-plates secured to the arms 7 of the reel inside the cloths. These gather the stuff, which has a tendency to remain at the bottom of the reel, and carry it upward, as shown in Fig. III, deposits it on inclined boards 31, located in the center of the reel, and down these inclined boards the stuff passes and falls against the reel, as shown in Fig. III. The boards 31 are supported on arms 32, hooked over the central shaft 3, as show in Fig. III, and upon their lower ends are secured adjustable weights 33, by which the boards are held at any desired pitch or inclination. It will be understood that by simply moving the weights in or out on the lower ends of the arms the inclination of the boards may be changed. By the use of these boards, upon which the angle-plates are continually depositing the stuff, the operation of the reel is greatly facilitated, as the stuff is being continually carried up and deposited with some force upon the uncovered surface of the cloth.

34 represents a feed-hopper, by which the stuff is delivered to the conveyer. (See Fig. I.)

I have only shown two boards 31 between the arms 7; but it is obvious that more may be provided.

The end of the shaft 3 opposite the conveyer is supported in an adjustable box 38, (see Fig. I,) which may be moved up or down by a set-screw 39, and the shaft may be adjusted endwise by a set-screw 40. (See Fig. II.)

I claim as my invention—

1. In a bolting-reel, the combination of a central shaft, a reel loosely mounted on the shaft, springs rigidly secured to the shaft and connecting the reel to said shaft, rods for moving the reel on the shaft, and means for imparting a reciprocating motion to said rods, substantially as and for the purpose set forth.

2. In a bolting-reel, the combination of a central shaft, a reel loosely mounted on the shaft, radial springs forming a positive connection between the reel and shaft, and reciprocating rods for imparting longitudinal movement to the reel, whereby the reel is made to revolve with the shaft at the same time it is allowed to reciprocate on the shaft, substantially as and for the purpose set forth.

3. In a bolting-reel, the combination of a central shaft, a reel, arms loosely mounted on a shaft and supporting the reel, springs secured to the shaft and having connection with the reel, a transverse shaft, cams on the transverse shaft, and rods 23, all substantially as and for the purpose set forth.

4. A bolting-reel consisting of a central shaft, heads loosely mounted on the shaft, rods connecting the heads, arms secured to the rods and mounted loosely on the shaft, and radial springs rigidly secured to the shaft and rods, whereby the whole is rotated by the shaft and allowed to reciprocate thereon, as herein set forth.

5. In a bolting-reel, the combination of a shaft, a reel consisting of heads, rods connecting the heads, arms secured to the rods and loosely mounted on the shaft, springs forming a positive connection between the rods and shaft, and means for imparting a longitudinal reciprocating motion to said reel, consisting of a transverse shaft, cams on said shaft, and reciprocating rods controlled by said cams, substantially as herein set forth.

6. In a bolting-reel, the combination of the central shaft, the boards 31, arms 32, hooked over the shaft and supporting the boards, adjustable weights on the arms, and angle-plates 30, secured to the reel, all substantially as and for the purpose set forth.

LYCURGUS LINDSAY.

In presence of—
W. A. MAUWR,
J. B. CHAMBERLAIN.